ic Office 3,447,081
Patented May 27, 1969

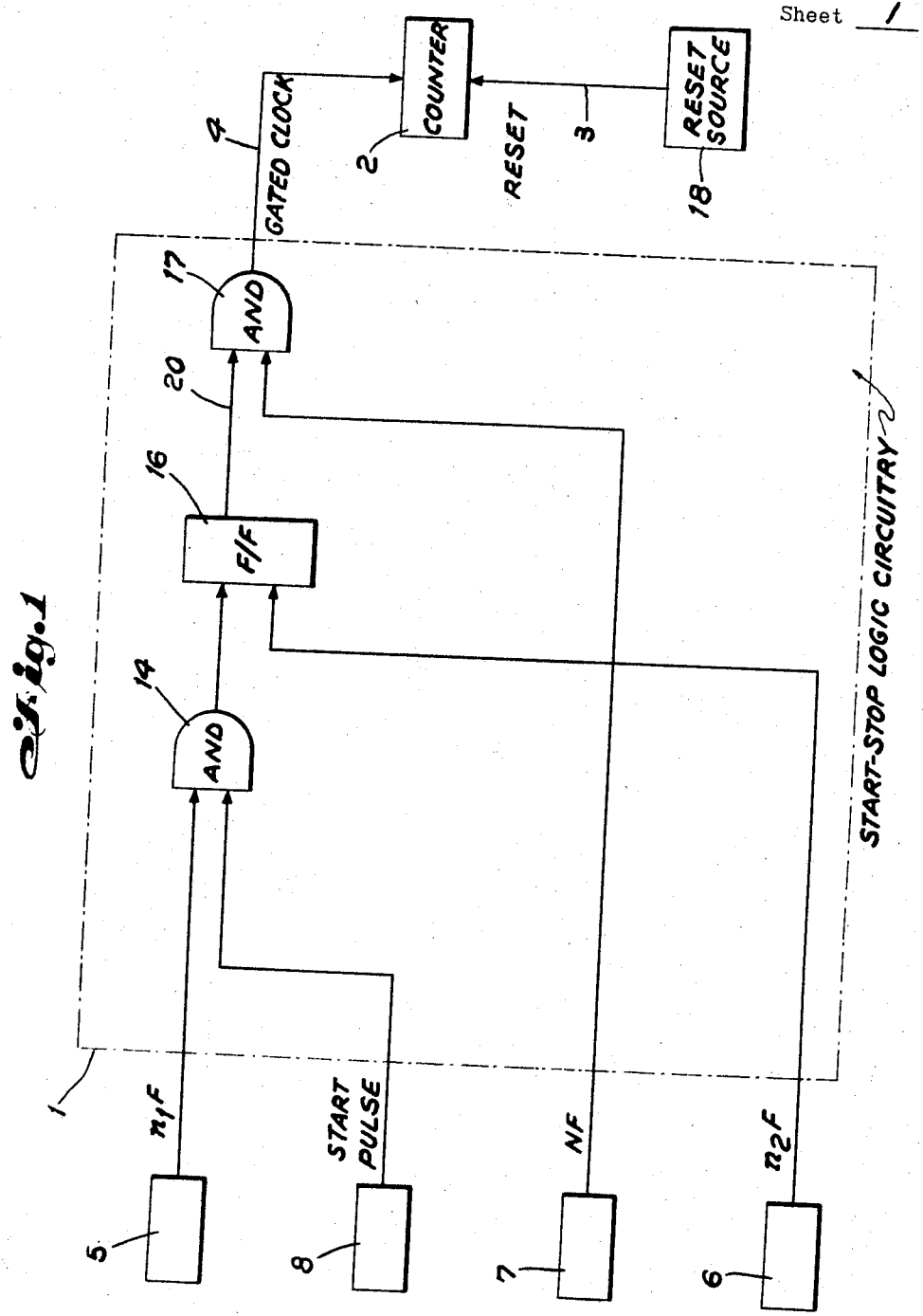

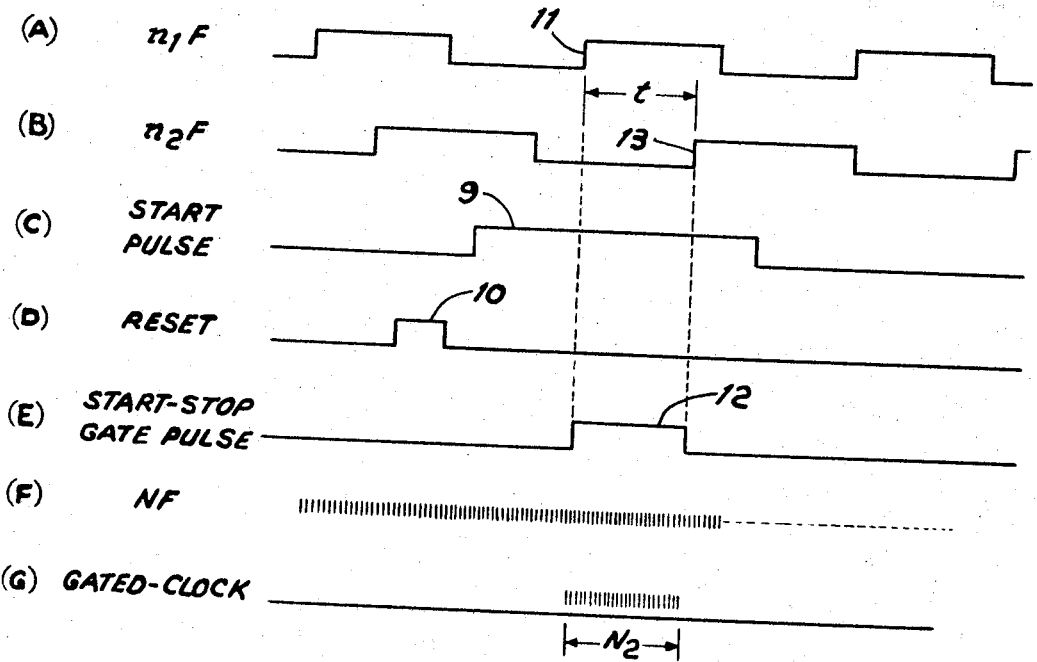
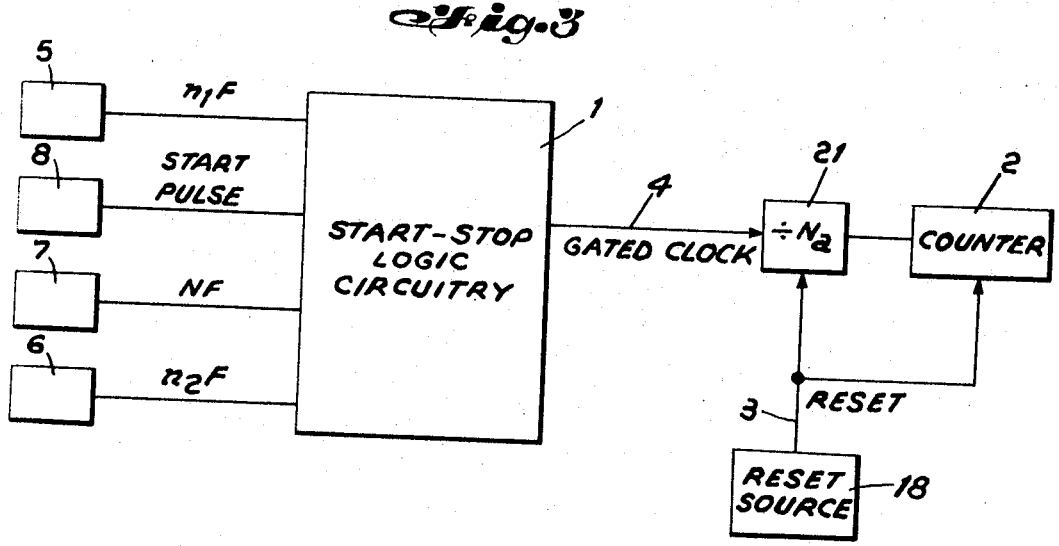

3,447,081
PHASE DETECTOR FOR HARMONICALLY RELATED SIGNALS
Rolf Gunnar Sommerud, Strommen, and Christian Fredrik Holmboe, Bekkestua, Norway, and James F. De Lorme, Irvington, N.J., assignors to International Telephone and Telegraph Corporation, a corporation of Delaware
Filed Aug. 19, 1966, Ser. No. 573,669
Int. Cl. G01n 25/00
U.S. Cl. 324—85   9 Claims

ABSTRACT OF THE DISCLOSURE

The phase difference between first and second harmonically related signals is measured relative to a common harmonic by applying said first signal directly and coupling said second signal via a first AND circuit, to a bistable multivibrator whose output signal gates, via a second AND circuit, the transmission of a third harmonically related signal, having a higher frequency than said first and second signals, to a recycling counter. The reading of said counter, which is periodically reset, is a measure of phase difference. A signal coupled to said first gate initiates counting. In a second embodiment, said third signal is coupled to said counter via a dividing circuit which also receives reset pulses in order to measure average phase difference.

---

This invention relates to phase detectors and more particularly to phase detectors for measuring the phase (or time) difference between two signals having a common subharmonic frequency.

A prior art method of measuring the phase difference between two different frequency signals having a common subharmonic frequency is to multiply or divide the two frequencies by predetermined amounts in order to convert them both into a common frequency. Then the phase difference between the two signals which have been brought to the common frequency is measured by standard techniques. Disadvantages of these methods are that multipliers (or dividers, as the case may be) are required in addition to the phase detection circuitry and the phase detector is incapable of providing the same phase error readout independent of where, in time the phase measurement is initiated.

Therefore, the main object of this invention is to provide an improved phase detector capable of measuring the phase (or time) difference between two signals having a common subharmonic frequency.

A further object of this invention is to provide a phase detector which will provide the same output independent of where in time the phase measurement is initiated.

A phase detector according to this invention measures the relative phase (or time) difference between two harmonically related signals which may be different frequency signals, the resulting number of degrees of phase difference being measured with respect to the lowest harmonic frequency common to both signals. This measurement may be initiated at any desired position in time relative to the two signals. This phase measurement may be repeated every $1/f^1$ seconds (where $f^1$ is a common submultiple of the frequencies of the two signals) if it is desired to check the same relative portions of the two signals each time. It is pointed out here, and it will be shown later, that this relative phase difference referred to a harmonic frequency common to both signals will have the same magnitude no matter where in time the phase measurement is made using the apparatus according to this invention.

When a phase detector is used in a system wherein the two frequencies are first converted to a common frequency by division before phase detection, it is recognized that depending upon where the division is initiated the magnitude of the time difference between the two signals could take on a plurality of values. Using the phase detector according to this invention the number of degrees of phase difference related to the common harmonic frequency will be the same no matter where the measurement is initiated.

According to this invention a phase detector for measuring the phase difference between two signals having harmonically related frequencies comprises a recycling counter, a source of signal having a higher frequency than said harmonically related frequencies, means responsive to one of said two signals for feeding said higher frequency signal to said counter and means responsive to the other of said two signals for stopping the feeding of said higher frequency signal to said counter, the final state of said counter being proportional to the relative phase difference between said two signals.

The above mentioned and other objects of this invention will become more apparent by reference to the following description taken in conjunction with the accompanying drawings, in which:

FIGURE 1 is a block diagram of a phase detector according to this invention;

FIGURE 2 illustrates the waveforms appearing at various designated points in the block diagram of FIGURE 1; and FIGURE 3 is a block diagram of the basis phase detector according to this invention further including an averaging circuit.

Referring now to FIGURE 1 a preferred embodiment of a phase detector according to this invention is illustrated which includes a recycling counter 2 coupled to start-stop logic circuitry 1, via gated clock line 4. Further coupled to the start-stop logic circuitry 1 are input signal sources 5 and 6, said input signals having frequencies $n_1F$ and $n_2F$ respectively. The object is to measure the phase (or relative time) difference between these two signals referred to a common harmonic frequency. Further coupled to start-stop logic circuitry 1 is a start pulse generator 8 for enabling the start-stop logic circuitry 1. Also coupled to the start-stop logic circuitry 1 is source of clock frequency signal 7 which provides a counting frequency. For this particular embodiment, source 7 provides clock pulses having a frequency NF which are generally shown in FIGURE 2F and which are higher in frequency than $n_1F$ and $n_2F$. Further coupled to counter 2 is a source of reset signal 18 for resetting said counter prior to the system making the next phase measurement.

A specific embodiment of the start-stop logic circuitry generally denoted at 1 in FIGURE 1 is more specifically described below. Starting pulse generator 8 and input signal source 6 are coupled to the inputs of AND-gate 14, the output of AND-gate 14 being coupled to an input of multivibrator 16. The output of signal source 6 is coupled to another input of multivibrator 16. Further provided is an AND-gate 17 which couples one of the outputs of multivibrator 16 and the output of clock source 7 to the input of counter 2 via gated clock lead 4.

Referring to FIGURES 1 and 2, let the output signal from source 5 have a frequency $n_1F$ and the output signal from source 6 have a frequency $n_2F$, as shown in FIGURES 2A and 2B respectively. For the purposes of this description these signals are taken to be digital in nature, as shown in FIGURE 2. Also, let nF be a common harmonic to $n_1F$ and $n_2F$ where $n$ is the smallest product common to $n_1$ and $n_2$. First, a reset signal is generated by source 18 for setting counter 2 to its initial starting position. Upon receipt of a start signal 9 (see FIGURE 2C) from starting pulse generator 8, AND-gate 14 is enabled. Now, upon receipt of the next positive going edge 11 of the first input signal having a frequency $n_1F$ after the generation of the starting pulse 9, AND-gate 14 provides a logical "1" output which sets multivibrator 16 so that it provides a logical "1" on its output lead 20. This logical "1" is the beginning of the gate pulse 12 illustrated in FIGURE 2E. This enables AND-gate 17 which will now gate the pulses produced by clock source 7, having a frequency NF to the counter 2. These gated pulses are referred to as gated clock pulses and are illustrated in FIGURE 2G. The counter 2 counts from 0 to $(N_1-1)$ and then automatically starts counting from 0 again, where $N_1=N/n$. Upon the receipt of the immediately following positive going edge 13 of the second input signal having the frequency $n_2F$, the gating pulse 12 appearing on the output lead 20 of multivibrator 16 is turned off by means of the leading edge 13 resetting multivibrator 16, thereby stopping the gating of the clock pulses from frequency source 7 (FIGURE 2G) to counter 2. During this period "$t$" between leading edges 11 and 13 of the first and second input signals, respectively the counter 2 accumulates a certain number of counts. Note that the counter 2 just counts up to $(N_1-1)$ and then recycles (where $N_1=N/n$)

The final state of the counter 2 is proportional to the phase difference measured in degrees with respect to the common harmonic frequency of the two input signals, $n_1F$ and $n_2F$. At this point the starting pulse 9 is turned off, thereby disabling AND-gate 14. In this particular embodiment, starting pulse 9 must have a duration long enough so that the phase measurement may be completed. It is recognized though, that other starting pulse schemes may be provided within the spirit of this invention.

The accuracy of the phase measurement is readily seen to be directly dependent upon the frequency NF of the pulses produced by frequency source 7. The higher the frequency of this signal, the better will be the resolution and accuracy of the phase detector according to this invention.

A simple proof that the final state of the counter 2 is proportional to the phase difference between the two input signals is given below. Referring to FIGURE 2, take any positive going edge 11 of the signal of frequency $n_1F$ and the next following positive going edge 13 of the signal of frequency $n_2F$. The time interval "$t$" between these two positive going edges is:

$$t=t_1+(1/nF)M=t_1+T \quad (1)$$

where M is an integer, $n=K_1n_1=K_2n_2$ where $K_1$ and $K_2$ are integers and $0 \leq t_1 < 1/nF$. Let $N_2$ be equal to the number of pulses gated to the counter during the gating period "$t$." Then, $$N_2=t_1NF+N_1M \quad (2)$$

where $N/n=N_1$.

The second term $N_1M$ is a whole multiple of $N_1$ (since M is an integer) and therefore the *final* state $N_3$ of the counter 2 is only dependent on $t_1$. This is because the counter recycles every $N_1$ pulse, which is equivalent to counting up to $(n_1-1)$ and starting again at zero.

Accordingly:

$$N_3=t_1NF \quad (3)$$

where $0 \leq N_3 < N_1$.

The phase angle $\theta$ ($nF$) is therefore given by:

$$\theta(nF)=2\pi t_1 nF=2\pi N_3/N_1 \quad (4)$$

It is clearly seen that the phase difference $\theta$ ($nF$) is proportional to the final state $N_3$ of the counter 2 since the quantity $N_1$ is a constant term and does not affect the output since the counter 2 recycles every $N_1$ count.

It is noted that the relative phase (or time) difference between the two input signals taken with respect to the common subharmonic frequency is independent of where (in time) the measurement is initiated since the counter 2 is of the recycling type and recycles every 360° of the common harmonic frequency or every $(N_1-1)$ counts of the frequency NF. Therefore, the fractional part of the cycle that remains accumulated by the counter (independent of how many times it recycles) is always proportional to the phase (or time) difference between the two signals referred to at the common harmonic frequency.

It is pointed out that the start-stop logic circuitry 1 may take the particular form illustrated in FIGURE 1 or may be redesigned within the spirit of this invention by anyone ordinarily skilled in the art and having at his disposal the specification of the operation of the system as set forth above. Therefore, it is clear that the invention is not intended to be limited by the particular start-stop circuitry shown. Also, the recycling counter 2 is well known in the art and a detailed description thereof is deemed unnecessary for the purposes of this disclosure. Further the reset source 18 is shown only by way of example, it being recognized that reset pulses may be generated in any number of ways, the particular method used not being critical to the invention.

It is further pointed out that the invention will operate without the provision of a starting pulse and the associated circuitry as long as means are provided for resetting the counter 2 bewore each desired phase measurement. This may be accomplished within the spirit of this invention by one reasonably skilled in the art. But, if it is desired to periodically measure the phase difference between the two input signals then the starting pulse generator 8 is required. In such a case the generator 8 must periodically generate a pulse (similar to pulse 9 of FIGURE 2C) to initiate each phase measurement.

Referring to FIGURE 3, a scheme for deriving an average phase difference measurement from a plurality of phase difference samples is illustrated. All of the circuit elements common to both FIGURES 1 and 3 are given the same reference designations wherever possible. In FIGURE 3 the gated clock lead 4 from start-stop circuitry 1 is coupled to a divider 21 which divides by the number of phase difference samples, $N_a$, over which it is desired to take the average. The output of this divider is then coupled to counter 2 which recycles every $(N_1-1)$ counts. In this circuit the phase samples must all be taken at the same relative time positions of the two input signals in order that M will be the same for all samples. For example, for input frequencies of $5f$ and $6f$, the samples can be taken every $N_5/f$ seconds. It is also clear that in such a case the starting pulse generator 8 is required to generate a starting pulse every $N_5/f$ seconds, where $f$ is the common submultiple frequency and $N_5$ is an integer.

Operationally, assume that one desires to average out the phase measurement over 5 samples (i.e., $N_a=5$). Again, as in FIGURE 1, $N_1$ counts of the counter 2 corresponds to 360 degrees of the frequency $nF$. For ease of explanation, it is assumed that the two input signals, $n_1F$ and $n_2F$ have the same frequency (i.e., $n_1=n_2$) and the starting pulse generator 8 generates a starting pulse that has a duration equal to the time required to take all of the $N_a$ samples. First, a reset pulse is generated by source 18 which resets divider 21 and counter 2. Then a starting pulse is generated by source 8. Upon the next occurring leading edge of the first input signal, the clock signal from source 7 of frequency NF will be gated via lead 4 to divider 21. The output from divider 21 is then fed to counter 2. The next leading edge of the second input signal will stop this gating and the next successive leading edge of the first input signal will start it again since the starting pulse is still present. This sequence of events will continue for the duration of the start pulse which is generated by source 8, which duration is long enough so that the desired number of samples are taken. Divider 21 divides by the number of samples over which the measurement is averaged and feeds the contribution from each sample to counter 2 which sums up these contributions. The final state of counter 2 is proportional to the average phase difference between the two input signals. Note that in this particular example, since the two input signals have the same frequency, M will be the same for all samples and the samples may be taken from successive leading edges of the signals, thereby simplifying the averaging technique.

The number of pulses $N_4$ fed into counter 2 when "$t$" is substantially constant for the sampling period is:

$$N_4 = tNFNa/Na = tNF \qquad (5)$$

Using Equations 1 and 2:

$$N_4 = t_1NF + MN/n = t_1NF + MN_1 \qquad (6)$$

Since M is an integer and the counter 2 recycles every $(N_1-1)$ counts, the term $MN_1$ in Equation 6 may be neglected and the final state of the counter which has been fed $N_4$ counts is proportional to $\theta$ ($nF$) as was shown in Equations 3 and 4.

This averaging technique could also be carried out using input signals having different harmonically related frequencies by slightly modifying the start-stop logic circuitry 1 and by causing starting pulse generator 8 to generate $Na$ start pulses spaced by any period of frequency which is a common submultiple of the input signals. This is to insure that M is constant for all samples. For use of the averaging technique with two different frequency input signals, the reset pulse for divider 21 and counter 2 is only generated before the first one of the $Na$ start pulses. These modifications are straightforward and may be carried out by one reasonably skilled in the art within the spirit of this invention.

We claim:
1. A phase detector comprising:
   source means producing two signals having different, harmonically related, frequencies;
   a recycling counter;
   a source of signal harmonically related to and of higher frequency than said two signals;
   means responsive to one of said two signals for feeding said higher frequency signal to said counter; and
   means responsive to the other of said two signals for stopping the feeding of said higher frequency signal to said counter, the final state of said counter being proportional to the relative phase difference between said two signals.

2. A phase detector according to claim 1 further comprising means coupled to said means for feeding for generating a starting pulse.

3. A phase detector according to claim 2, wherein said means for feeding is responsive to said one signal only after said starting pulse is received.

4. A phase detector according to claim 3 wherein said means for stopping is responsive to said other signal only after said means for feeding responds to said first signal.

5. A phase detector according to claim 2 further comprising means coupled to said counter for resetting said counter prior to said feeding of said higher frequency signal thereto.

6. A phase detector according to claim 2 wherein said starting pulse generator periodically generates starting pulses.

7. The phase detector according to claim 1 further comprising means coupled between said responsive means and said recycling counter for causing the final state of said counter to be proportional to the average phase difference between said two signals taken over a predetermined number of phase measurement samples.

8. The phase detector according to claim 7 wherein said means coupled between said responsive means and said counter is a frequency divider.

9. The phase detector according to claim 8 wherein said frequency divider divides by the number of samples over which the phase measurement is to be averaged.

References Cited

UNITED STATES PATENTS 2,702,367   2/1955   Ergen.

OTHER REFERENCES

IBM technical disclosure bulletin, vol. 3, No. 2, July 1960, p. 35.

RUDOLPH V. ROLINEC, *Primary Examiner.*

P. F. WILLE, *Assistant Examiner.*